(12) United States Patent
Igarashi

(10) Patent No.: US 8,522,825 B2
(45) Date of Patent: Sep. 3, 2013

(54) FLUID APPARATUS UNIT STRUCTURE

(75) Inventor: Hiroki Igarashi, Gyoda (JP)

(73) Assignee: Surpass Industry Co., Ltd., Gyoda-Shi (JP)

( * ) Notice: Subject to any disclaimer, the term of this patent is extended or adjusted under 35 U.S.C. 154(b) by 599 days.

(21) Appl. No.: 12/600,682

(22) PCT Filed: May 20, 2008

(86) PCT No.: PCT/JP2008/059216
§ 371 (c)(1),
(2), (4) Date: Nov. 18, 2009

(87) PCT Pub. No.: WO2008/146657
PCT Pub. Date: Dec. 4, 2008

(65) Prior Publication Data
US 2010/0180963 A1    Jul. 22, 2010

(30) Foreign Application Priority Data

May 25, 2007  (JP) ................................. 2007-139287

(51) Int. Cl.
*F16K 27/08* (2006.01)
*F16B 39/08* (2006.01)
*F16B 39/10* (2006.01)

(52) U.S. Cl.
USPC ........... 137/884; 137/269; 137/597; 251/367; 411/87; 411/90; 411/101

(58) Field of Classification Search
USPC ........... 137/597, 884, 269; 251/367; 401/87, 401/90, 101
See application file for complete search history.

(56) References Cited

U.S. PATENT DOCUMENTS

| 2,223,326 A | * | 11/1940 | Leshure ........................ 451/548 |
| 2,457,066 A | * | 12/1948 | Pepersack ..................... 220/327 |
| 4,023,257 A | * | 5/1977 | Wright et al. ................... 29/460 |
| 6,260,582 B1 | * | 7/2001 | Trautmann .................... 137/884 |

FOREIGN PATENT DOCUMENTS

| JP | 2002305010 A |   | 10/2002 |
| JP | 2003526759 A |   | 9/2003 |
| JP | 2005307994 A | * | 11/2005 |
| JP | 2005351309 A |   | 12/2005 |

OTHER PUBLICATIONS

International Search Report for PCT/JP2008/059216, dated Jul. 1, 2008.

* cited by examiner

*Primary Examiner* — Craig Schneider
*Assistant Examiner* — Atif Chaudry
(74) *Attorney, Agent, or Firm* — Pearne & Gordon LLP

(57) ABSTRACT

A fluid apparatus unit structure in which a uniform tightening force is easily applied over the entire periphery by tightening a plurality of fastening members to obtain an advantageous sealing performance is provided. In s fluid apparatus unit structure in which plural fluid apparatus components that are connected via flow paths are collected together and integrated onto a base member, a casing member for the fluid apparatus components is partitioned into plural members in the base member mating direction, a female threading portion assembly (19) in which plural nut portions (18*a*) that form female threading portions that communicate in the mating direction are integrated by a linking member (18*b*), is fit and installed on base side partitioned members of a casing member that is disposed at a position in close contact with a base member or a base members, and with base side member interposed therebetween, different fastening members are threaded and tightened from both sides of the nut portion (18*a*).

1 Claim, 12 Drawing Sheets

FLUID APPARATUS UNIT STRUCTURE

TECHNICAL FIELD

The present invention relates to a fluid apparatus unit structure that integrates fluid apparatus components such as valves and pressure switches.

BACKGROUND ART

Conventionally, in an apparatus that handles a fluid such as a chemical and the like, a fluid apparatus unit structure has been developed that gathers together and integrates plural fluid apparatus components with the goal of reducing the footprint (i.e., the projective area in plan view), which is advantageous in reducing the size of an apparatus having a reduced component installation space, reducing the leak points, which is advantageous for the reliability of the apparatus and simplification of the maintenance, and reducing the dead volume, which enables the effective use of the fluid. Such a fluid apparatus unit structure is used, for example, for removing a chemical fluid as necessary while carrying out chemical fluid circulation and water circulation, and is structured such that various types of fluid components that serve as structural elements (for example, valves regulators, various types of sensors such as pressure sensors, and various types of switches such as pressure switches and the like) are gathered together onto a base member and integrated by connecting the components by pipes.

In a conventional valve body, generally, a structure in which several locations are tightened by using joining members such as screws and bolts and the like is used as an assembly structure that integrates the structural members of a partitioned body (for example, see Patent Document 1)

Citation List

Patent Literature
Patent Document 1:
Japanese Unexamined Patent Application, First Publication 2005-351309 (refer to FIG. 7)

In the fluid apparatus unit structure described above, in the case in which a structure is used in which a casing (body) member for fluid apparatus components is partitioned in the direction in which it is joined to the base member, and the casing is integrated with the base member by being tightened by joining members such as bolts, it is necessary to ensure the sealing characteristics between surfaces by making the fastening force (compressive force) due to the plurality of fastening members uniform. In particular, in the case of a fluid apparatus unit structure that handles a slurried chemical fluid, it is undesirable that contamination adhere to an O-ring due to the solidification of the chemical fluid. Because a sealing structure that does not use an O-ring is utilized, tightening a plurality of fastening members uniformly is indispensable to ensuring advantageous sealing characteristics.

However, when using a plurality of fastening members, the operation of making the fastening pressure uniform requires labor and skill. Furthermore, as the separation distance from the fastening members becomes larger, there is a tendency for differences in the compressive force between surfaces to occur, and thus, maintaining a uniform sealing performance between members over the entire periphery thereof is difficult.

In consideration of the problems described above, it is an object of the present invention to provide a fluid apparatus unit structure that easily applies a uniform fastening force over an entire periphery and can attain advantageous sealing characteristics by tightening a plurality of fastening members.

DISCLOSURE OF INVENTION

To solve the problems described above, the present invention uses the following solution.

According to one aspect of the present invention is a fluid apparatus unit structure in which plural fluid apparatus components that are connected via flow paths are collected together and integrated onto a base member. The casing member for the fluid apparatus components is partitioned into plural members in the base member mating direction, a female threading portion assembly, in which plural female threading portions that communicate in the mating direction are integrated by linking members, is fit and installed on base side partitioned members of a casing member that is disposed at a position in close contact with a base member or a base members, and with base side member interposed therebetween, different linking members are threaded and tightened from both sides of the female threading member.

According to such a fluid apparatus unit structure, the casing member for the fluid apparatus components is partitioned into plural members in the base member mating direction, and a female threading portion assembly, in which plural female threading portions that communicate in the mating direction are integrated by a linking member, is fit and installed on a base side partitioned member of a casing member that is disposed at a position in close contact with a base member or a base member. With a base side member interposed therebetween, different linking members are threaded and fastened from both sides of the female threading member. Thus, the fastening force (compressing force) of both members that can be obtained by tightening each of the linking members acts substantially uniformly over the entire periphery of the seal surface via the linking member.

In the case in which the cross-sectional profile of the flow paths that are to be sealed is circular, in order to obtain a uniform fastening force over the entire periphery of the seal surface, an advantageous female threading portion assembly is one in which the linking member has a round ring shape, and the forming members of the female threading portion are arranged in a uniform pitch in the peripheral direction of the linking member.

According to the fluid apparatus unit structure described above, the fastening force (compression force) of both members obtained by tightening each of the fastening members acts substantially uniformly over the entire periphery of the seal surface via the linking member, and thus, an advantageous sealing performance, in which the inter-surface sealing performance between both members is maintained substantially uniformly over the entire periphery, can be easily obtained by a comparatively simply operation.

By using the female threading portion assembly, when carrying out the operation in which the different fastening members are threaded and tightened from both sides of the female threading portion, the female threading portion assembly does not turn along with the fastening member, and thus, the effect is attained that the fastening operation for the linking member is simplified.

BEST MODE FOR CARRYING OUT THE INVENTION

An embodiment of the fluid apparatus unit structure according to the present invention will be explained with reference to the figures.

Figure 5:
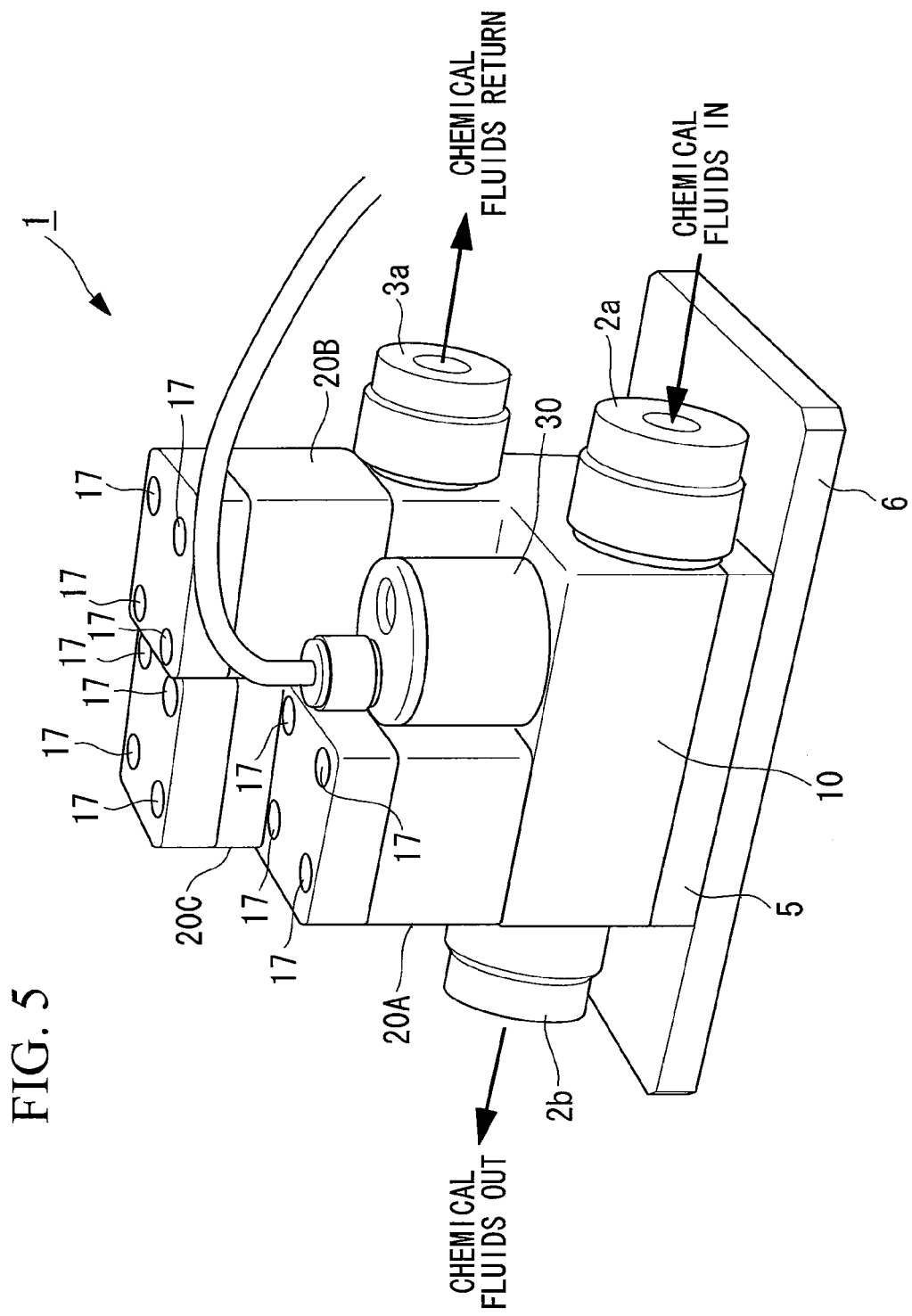
FIG. 5 is an external perspective view that shows an embodiment of the fluid apparatus unit structure according to the present invention.
Figure 6:
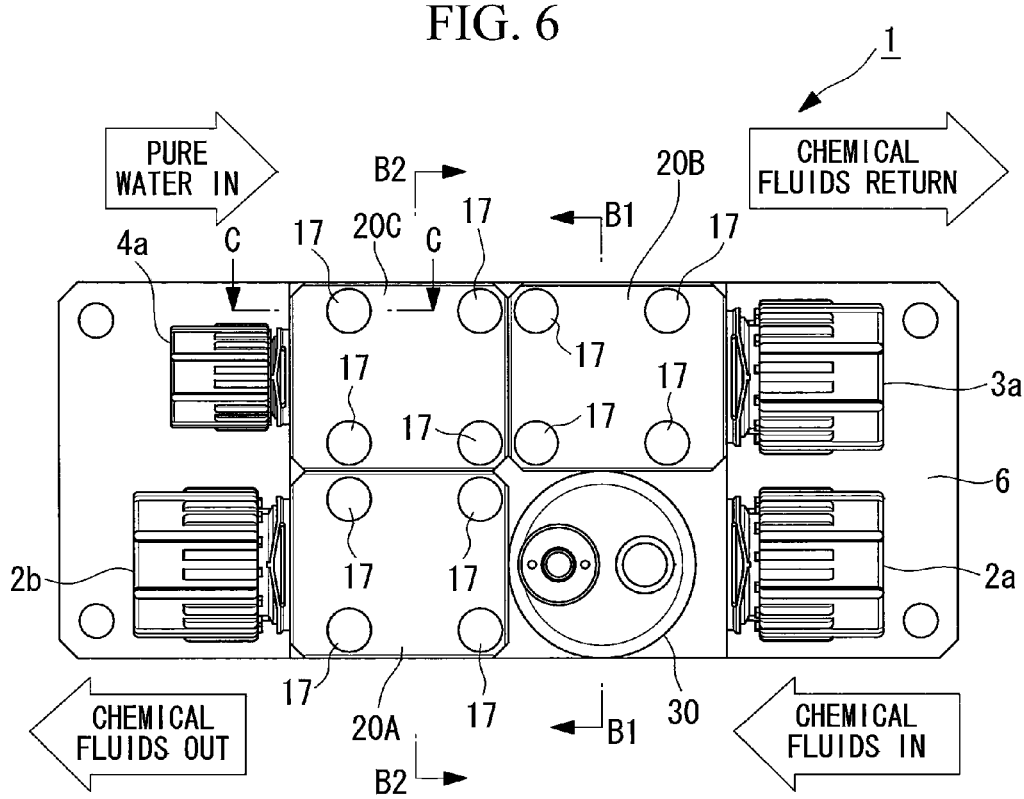
FIG. 6 is a plan view of FIG. 5
Figure 7:
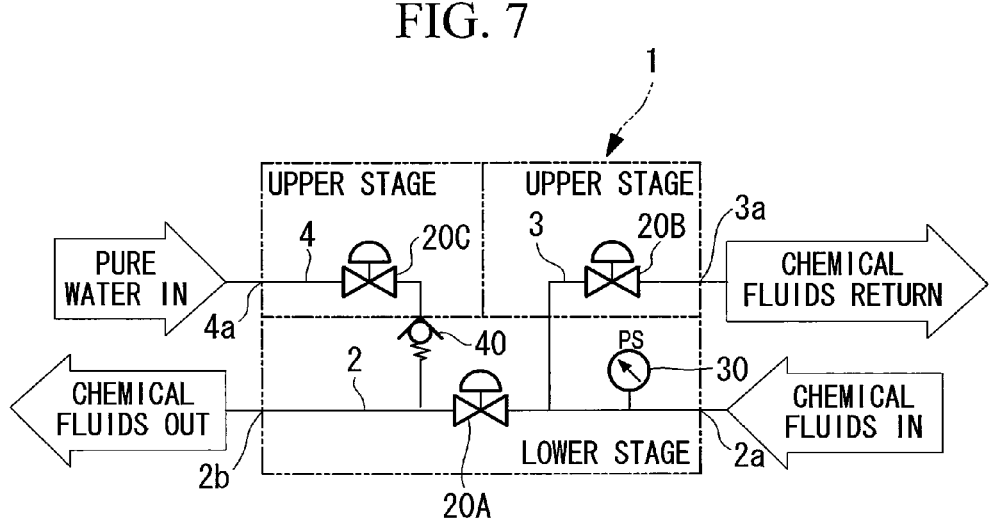
FIG. 7 is a schematic diagram that shows an example of the flow path configuration of the fluid apparatus unit shown in FIG. 5.
Figure 8:
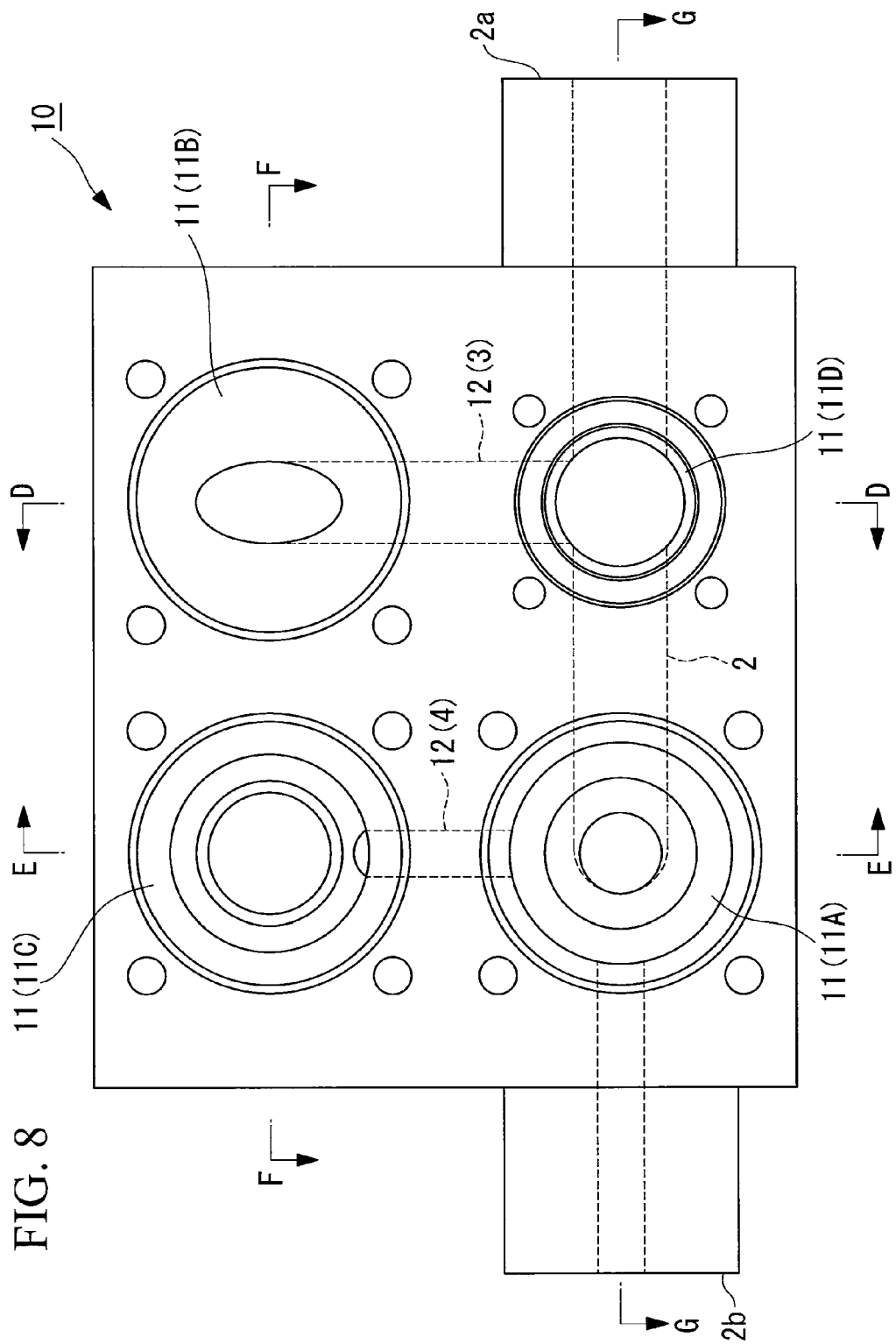
FIG. 8 is a plan view that shows an example of the structure of the base member.

The structure of the fluid apparatus unit 1 shown in FIG. 5 and FIG. 6 gathers together and integrates plural fluid apparatus components, which are connected by flow paths, into a base member 10. In the illustrated example of a structure, the principal parts of the fluid apparatus unit 1 are made of a chemically-resistant fluorocarbon resin. The three air pressure operating valves 20A, 20B, and 20C, the pressure sensor 30, and the check valve 40, shown in FIG. 7, are used as the fluid apparatus components, and these fluid apparatus components are gathered together and integrated onto a base member. Reference numeral 5 indicates a base fastening plate, and 6 indicates a unit base.

FIG. 7 shows the flow path (circuit) configuration of the fluid apparatus unit 1, and in this example of a flow path configuration, a first air pressure operating valve 20A and a pressure sensor 30 are provided on the chemical fluid flow path 2, and a second air pressure operating valve 20B is provided on the chemical fluid return path 3, which branches off the chemical fluid flow path 2 upstream of the first air pressure operating valve 20A, and a third air pressure operating valve 20C and a check valve 40 are provided on a pure water flow path 4 that merges with the chemical fluid flow path 2 downstream of the first air pressure operating valve 20A. Reference numeral 2a in the figure indicates a chemical fluid inlet, 2b indicates a chemical fluid outlet, 3a indicates a chemical fluid return outlet, and 4a indicates a pure water inlet.

As shown, for example, in FIG. 8 to FIG. 12, the base member 10 is provided with plural installation surfaces 11 that are provided for installing the fluid apparatus components described above and have differing heights, and slanted flow paths 12 that link the plural installation surfaces inside the base member 10.

In this case, the base member 10 has a substantially solid rectangular shape, and because the fluid apparatus components described above are installed on the upper surfaces thereof, four installation surfaces 11 are provided such that the center positions are disposed so as to define a rectangle. In the following explanation, the installation surface on which the first air pressure operating valve 20A is installed defines a first installation surface 11A, the installation surface on which the second air pressure operating valve 20B is installed defines a second installation surface 11B, the installation surface on which the third air pressure operating valve 20C is installed defines a third installation surface 11C, and furthermore, the installation surface on which the pressure sensor 30 is installed defines a fourth installation surface 11D.

Figure 10:
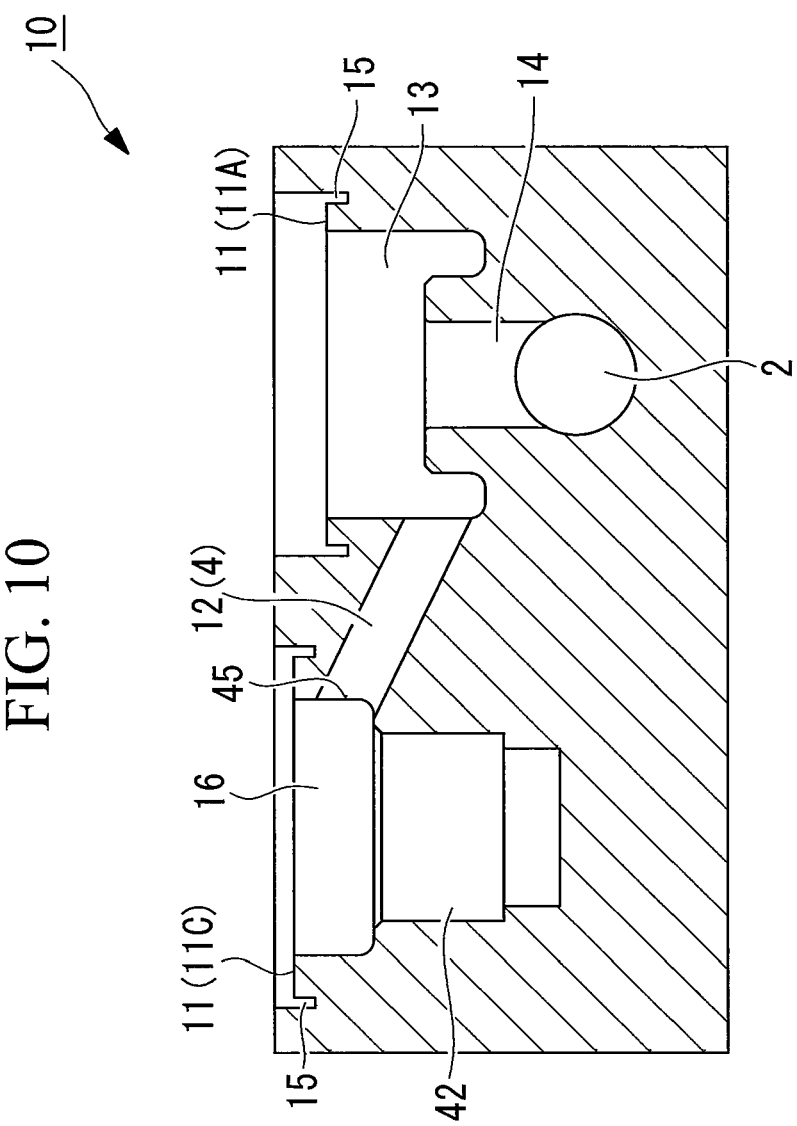
FIG. 10 is a cross-sectional view along E-E in FIG. 8.
Figure 11:
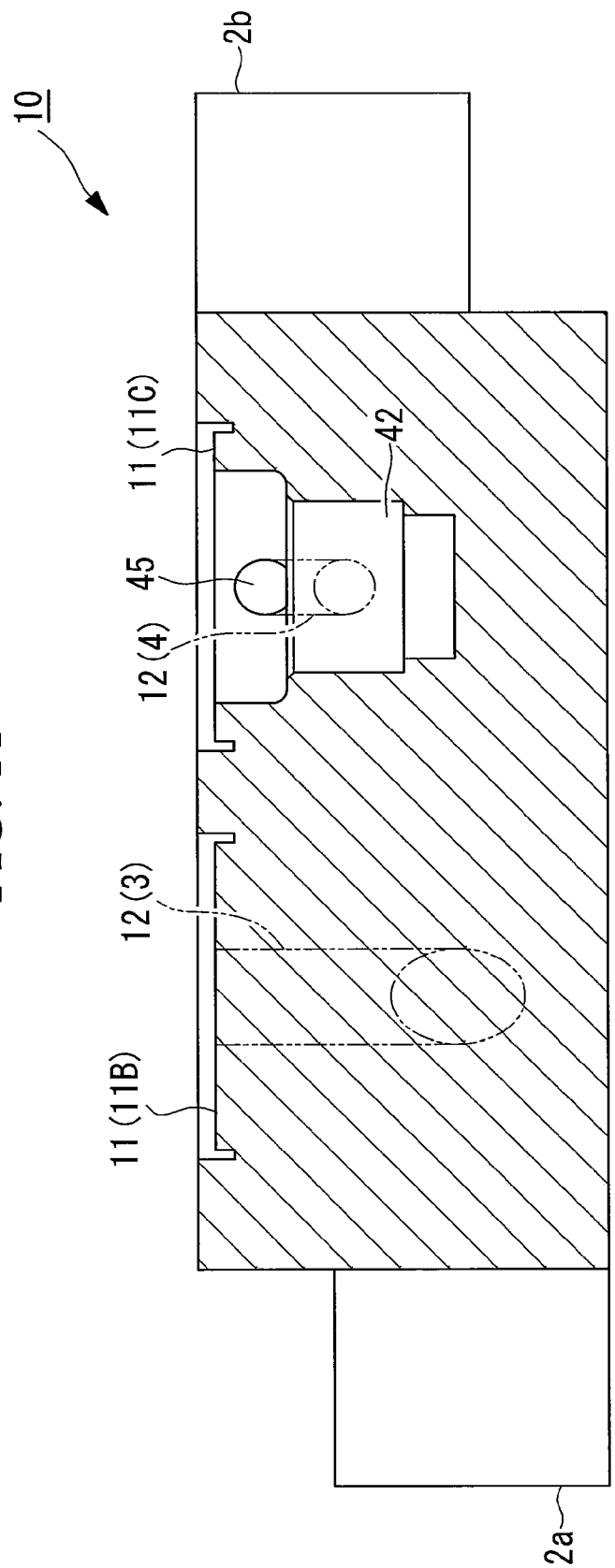
FIG. 11 is a cross-sectional view along F-F in FIG. 8.

As shown in FIG. 10, the first installation surface 11A is a deep installation surface that is formed by boring into the upper surface of the base member 10. A columnar space 13 is formed that accommodates the valve body 21 of the air pressure operating valve 20A, as shown, for example, in FIG. 14, under the first installation area 11A. At the bottom of the columnar space 13, a vertical flow path portion 14 is formed so as to communicate with the tunnel shaped chemical fluid flow path 2 that passes in a horizontal direction through the inside of the accommodation portion of the base member 10.

Figure 14:
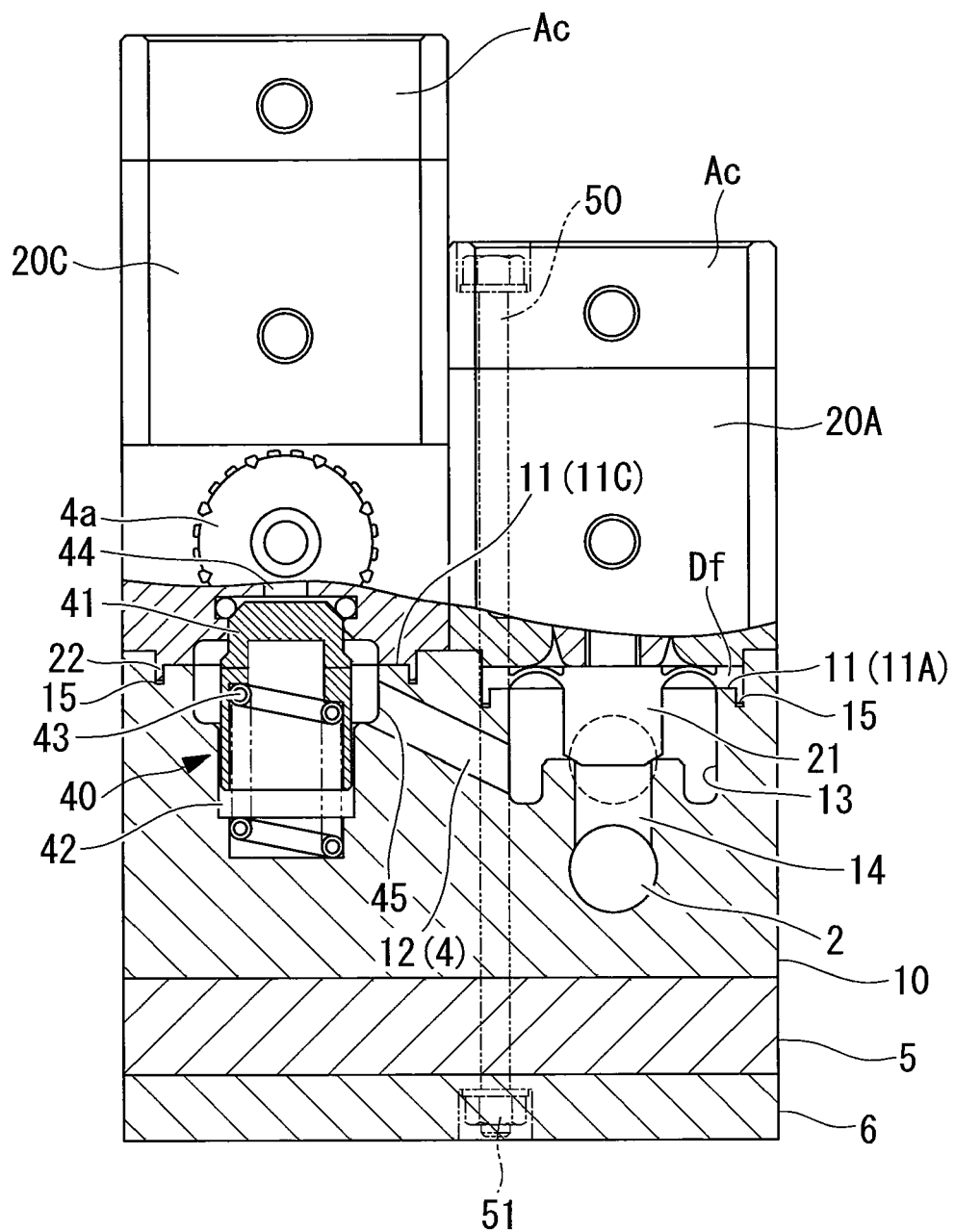
FIG. 14 is a cross-sectional view along B2-B2 in FIG. 8.

Reference numeral 15 in FIG. 14 is a ring-shaped concave portion, and by inserting a convex portion of the air pressure operating valve 20A, which is formed into a diaphragm Df, into the ring-shaped concave portion 15, a linking portion sealing structure between the base member 10 and the air pressure operating valve 20A is formed. Above the diaphragm Df, an actuator Ac for opening and closing the valve by using air pressure is disposed.

The air pressure operating valve 20A is inserted and installed by being introduced from above onto the first installation surface 11A of the base member 10 that has been formed in this manner, and for example, as shown by the imaginary line in FIG. 14, by tightening the feedthrough bolts 50 and the nut 51a, the linking portion sealing structure is firmly held by fitting the ring-shaped concave portion 15 and the diaphragm Df together.

Preferably, the feedthrough bolt 50 and the nut 51 used here have a partitioned bolt structure for reasons to be explained below.

As shown in FIG. 10, the third installation surface 11C is an installation surface having a shallow depth that is formed so as to substantially align with the upper surface of the base member 10. That is, the third installation surface 11C is positioned higher than the first installation surface 11A described above. As shown, for example, in FIG. 10, below the third installation surface 11C, a columnar space for a valve body accommodating portion 42 is formed under the flow path space 16 for accommodating and installing the valve body 41 of the check valve 40. In FIG. 14, reference numeral 15 indicates a ring-shaped concave portion, and when the fluid apparatus is installed, a ring-shaped convex portion that is provided at the bottom portion on the fluid apparatus side is pressed as necessary therein to form a sealing structure for the linking portion.

On the third installation surface 11C of the base member 10 formed in this manner, after the valve body 41 has been mounted in the valve body accommodating portion 42 from above with the spring 43 interposed therebetween, the air pressure operating valve 20C is inserted and installed by being introduced from above, and this is fastened by a bolt 17

(refer to FIG. 2) of the partitioned bolt structure described below. The linking portion in this case is sealed by fitting the ring-shaped convex portion 22 and the ring-shaped concave portion 15.

The illustrated check valve 40 is structured such that the fluid flowing in from the fluid inlet 44, which is provided on the upper portion thereof, flows out at the slanted flow path 12 downward from the fluid outlet 45, which opens in the side surface of the valve body accommodating portion 42. That is, in the fluid apparatus unit 1, in which the fluid apparatus components are gathered together and integrated onto the base member 10 described above, the valve body accommodation portion 42 of a check valve 40 is formed in the base member 10, and the fluid inlet 44 and the fluid outlet 45, which communicate with this valve body accommodating portion 42, are provided so as to intersect at a desired angle, for example, so that a fluid flows in from above and flows out in a horizontal direction.

If such a check valve 40 is used in the fluid apparatus unit 1, because the fluid inlet 44 and the fluid outlet 45 that communicate with the valve body accommodating portion 42 can be provided so as to intersect at a desired angle, there is the effect that the overall unit can be made compact. That is, unlike the conventional inline type, because the fluid inlet 44 and the fluid outlet 45 define a desired angle, the installation area, in particular, in a plan view, can be reduced.

In this connection, the columnar space 13 of the first installation space 11A and the flow path space 16 of the third installation surface 11C, described above, are linked by the slanted flow path 12, which forms a portion of the pure water flow path 4. This slanted flow path 12 is formed by inserting tools such as a drill into the flow path space 16 from the third installation surface 11C, which is at a shallow level, and the larger the level difference between the slanted flow path space 16 and the columnar space 13, the machining of a slanted flow path 12 having a larger inclination becomes possible.

That is, by making the level differences between the adjacent installation surfaces 11 large, an slanted flow path 12 having a large inclination angle can be easily formed even if a hole for machining is not provided. Therefore, the gap between the installation surfaces 11 that can be linked by these slanted flow paths 12 can be narrowed. In other words, by providing level differences between adjacent installation surfaces 11 of the base member 10 and linking these installation surfaces 11 by the slanted paths 12, it is possible to narrow and reduce the installation spacing between the flow apparatuses that are installed on the installation surfaces 11. In this case, because the installation angle of the slanted flow paths 12 becomes larger as the level difference becomes larger, it is possible to narrow the installation spacing.

Figure 12:
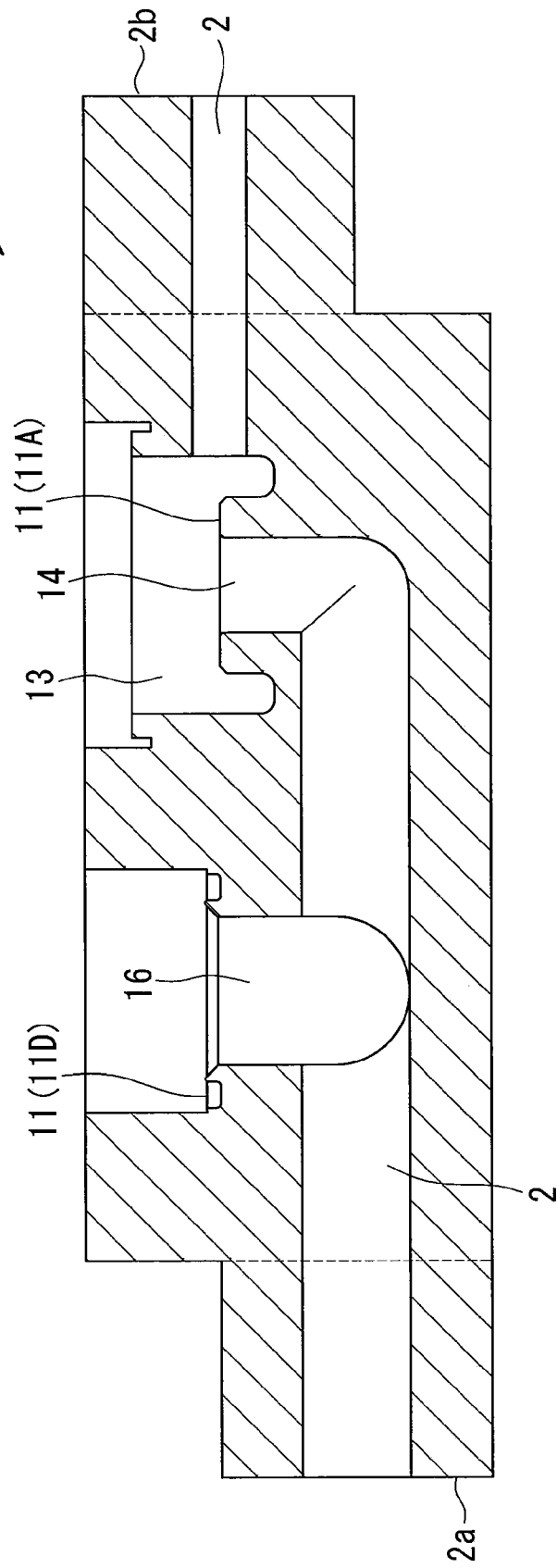
FIG. 12 is a cross-sectional view along G-G in FIG. 8.

As shown, for example, in FIG. 12, although the installation spacing between the fluid apparatuses can be narrowed by linking the adjacent fluid apparatuses by a horizontal path such as the chemical fluid flow path 2, the machining of such a horizontal path must be carried out by using tools such as drills from the side surface of the base member 10. Thus, a hole for machining can be used when linked with the outside of the base member 10, but when linking the flow apparatuses within the base member 10, a hole for machining that has been formed in the side surface of the base member 10 must be closed and sealed.

Figure 9:
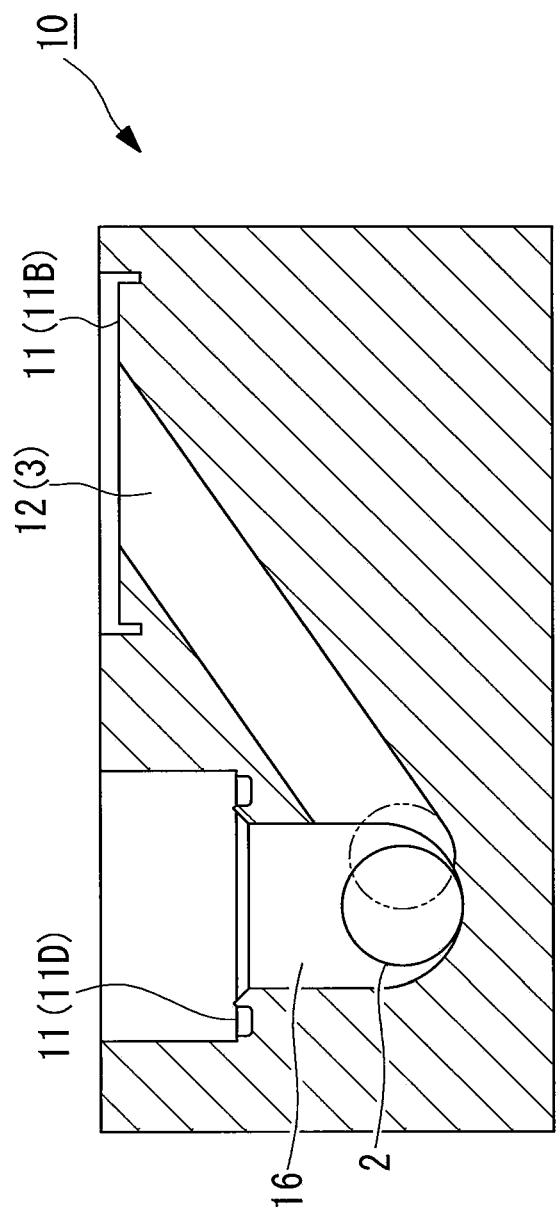
FIG. 9 is a cross-sectional view along D-D in FIG. 8.

As shown in FIG. 9, between the second installation surface 11B and the fourth installation surface 11D as well, an slanted flow path 12, which is part of the chemical fluid return flow path 3, is formed from the high-level second installation side 11B, which is formed so as to substantially align with the upper surface of the base member 11B, toward the lower level fourth installation surface 11D side, which is formed so as to be bored into the upper surface of the base member 10. In the figure, reference numeral 16 is a flow path space that is formed below the fourth installation surface 11D.

Figure 13:
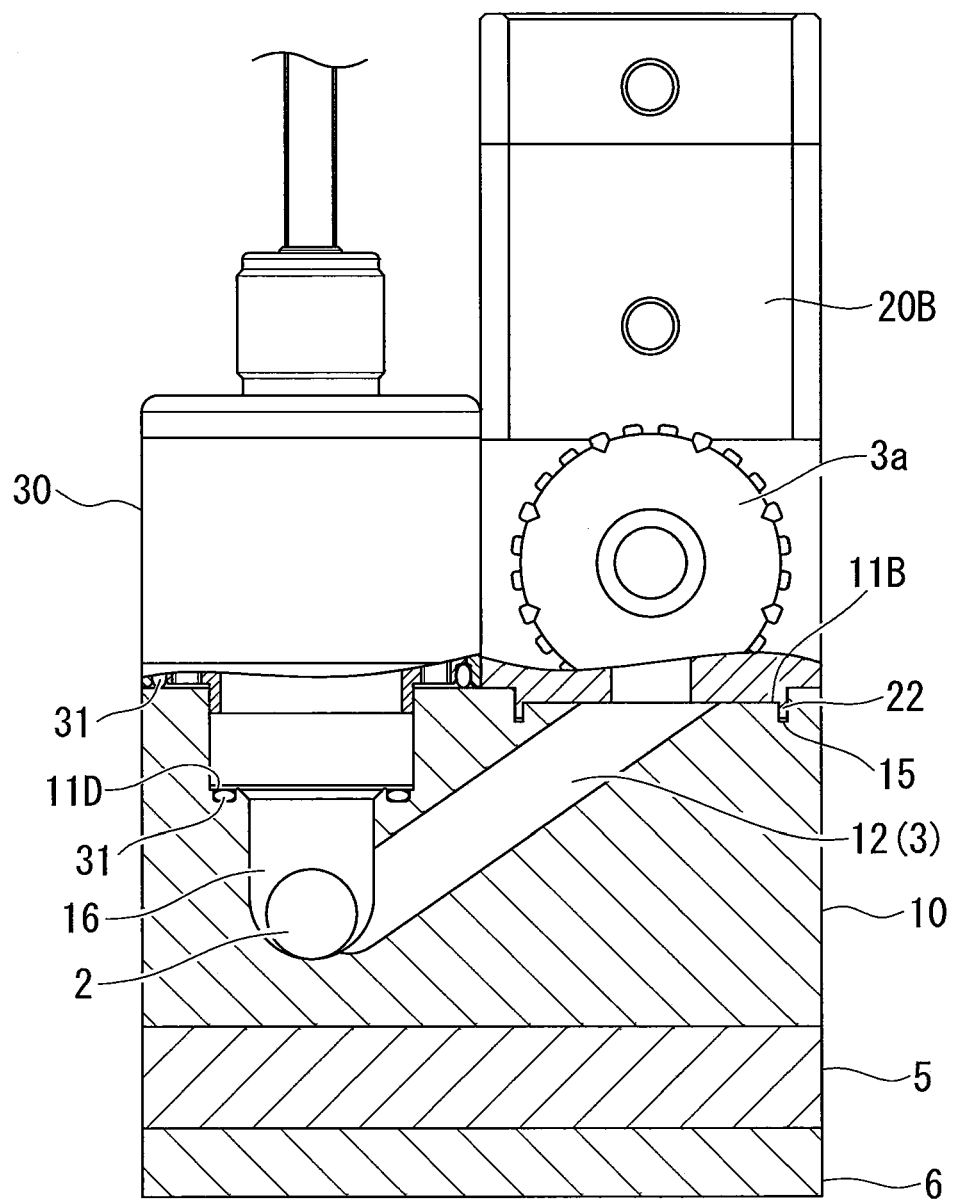
FIG. 13 is a cross-sectional view along B1-B1 in FIG. 8.

As shown, for example, in FIG. 13, an air pressure operating valve 20B is installed by being inserted from above onto the second installation surface 11B, and a pressure sensor 30 is installed by being inserted from above onto the fourth installation surface 11D. The linking portion between the air pressure operating valve 20B and the second installation surface 11B is sealed by the fitting the ring-shaped convex portion 22 and the ring-shaped concave portion 15 together, and the linking portion between the pressure sensor 30 and the fourth installation surface 11D is sealed by pressing the pressure sensor 30 onto the fourth installation surface 11D while interposing an O-ring 31 therebetween.

Figure 2:
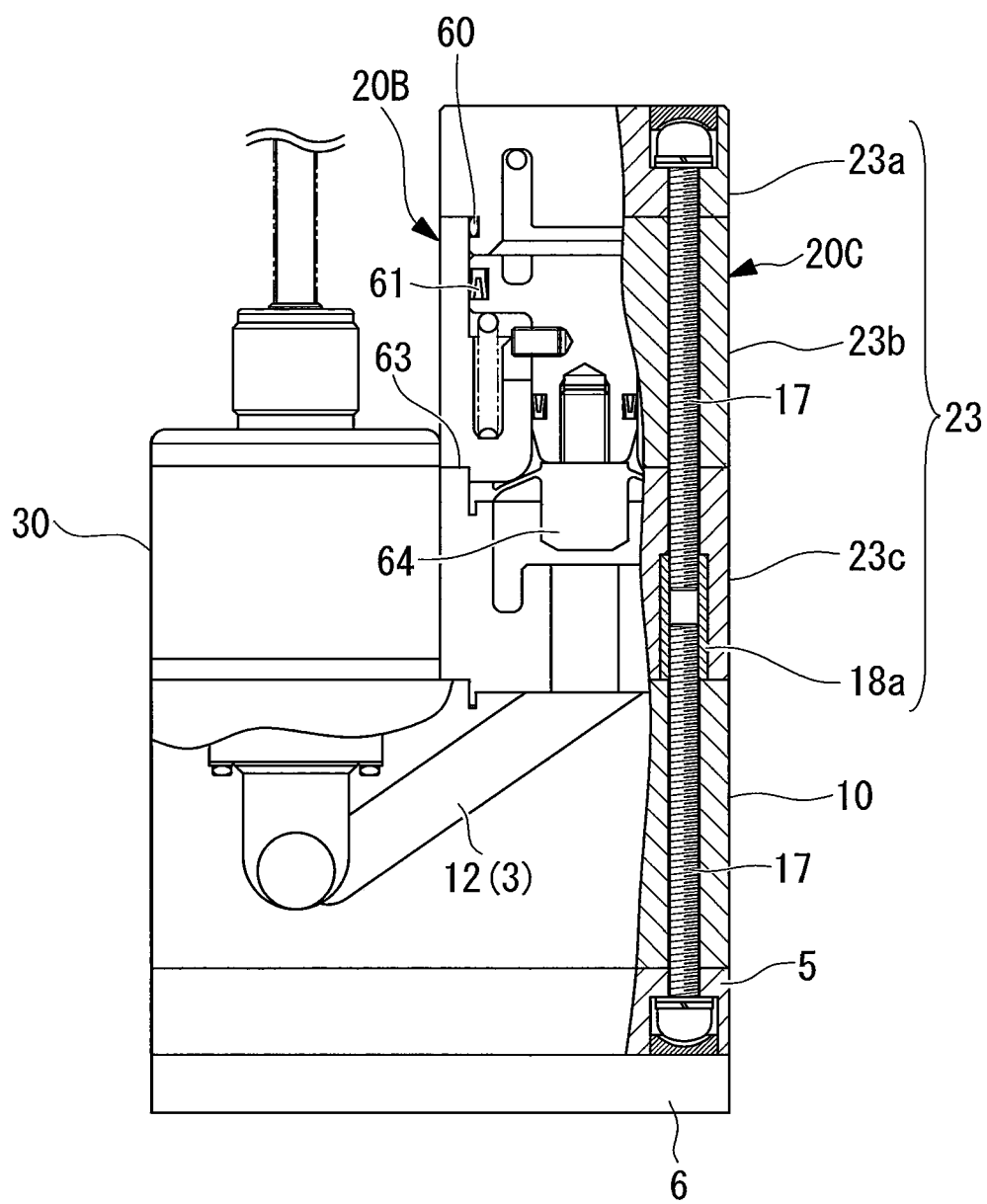
FIG. 2 is a cross-sectional view (along the cross-section C-C in FIG. 6) of the essential components showing a specific example of the partitioned bolt structure as an embodiment of the fluid apparatus unit structure according to the present embodiment.

In this connection, as shown, for example, in FIG. 2, in the tightening by the bolts 17 having a partitioned bolt structure described above, a casing member 23 for the fluid apparatus components is partitioned into plural elements (for example, reference numerals 23a to 23c in the figure) in a base member 10 mating direction, and a nut portion 18a forming a female threading portion that passes through in the mating direction is fit and attached in the base side member 23c of the casing member 23 that is disposed at a position in close connection with the base member 10. At the same time, the bolts 17 and 17 of different fastening members are threaded and tightened from both sides in the nut portion 18a with the base member 10 interposed therebetween. Plural nut portions 18a that are used here are provided on a female threading portion assembly 19 that is integrated by joining members 18b.

Figure 1A:
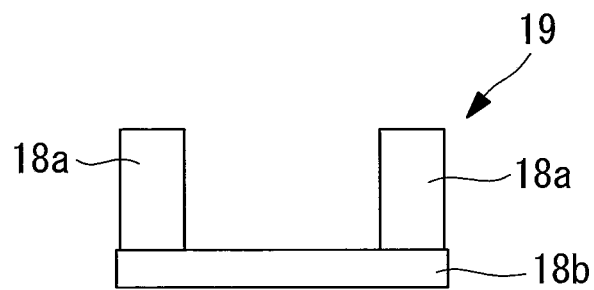
FIG. 1A is a drawing that shows an embodiment of the fluid apparatus unit structure according to the present invention, and is a frontal view of the female threading portion assembly that is used in the partitioned bolt structure.
Figure 1B:
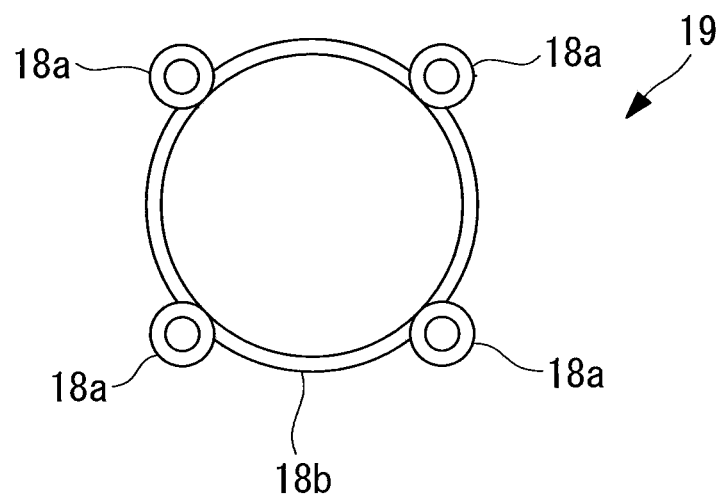
FIG. 1B is a frontal view of FIG. 1A.

As shown, for example, in FIG. 1A and FIG. 1B, the female threading portion assembly 19 is provided with plural nut portions 18a that are arranged at an even pitch in the peripheral direction of a cylindrical ring-shaped linking member 18b. In the illustrated example, the nut portions 18a are provided at four locations at a 90° pitch in the peripheral direction of the linking member 18b. The material for such a female threading portion assembly 19 can be suitably selected, depending on fluid characteristics and durability and the like according to use, not only from among, for example, metals such as stainless steels (SUS), but also from among resins such as polyetheretherketone, (PEEK) or polyphenylene sulfide (PPS) or the like.

In the partitioned bolt structure using the bolts 17 and nut portions 18a, described above, when the casing 23 of the air pressure operating valve 20B is arranged on the base member 10, with regard to the nut portion 18a formed in the base surface of the base side member (valve seat body) 23c that is disposed at a position in close contact with the base member 10, different bolts 17 and 17 are threaded and tightened from both end sides of the nut portions 18a such that the base member 10 is interposed therebetween. That is, the base surface of the base member 23c shown in FIG. 4 is formed by fitting and installing the female threading portion assembly 19 that is shown in FIG. 1A into the base side member 23c that is shown in FIG. 3 by pressing the female threading portion assembly 19 in the direction of the white arrow.

Figure 3:
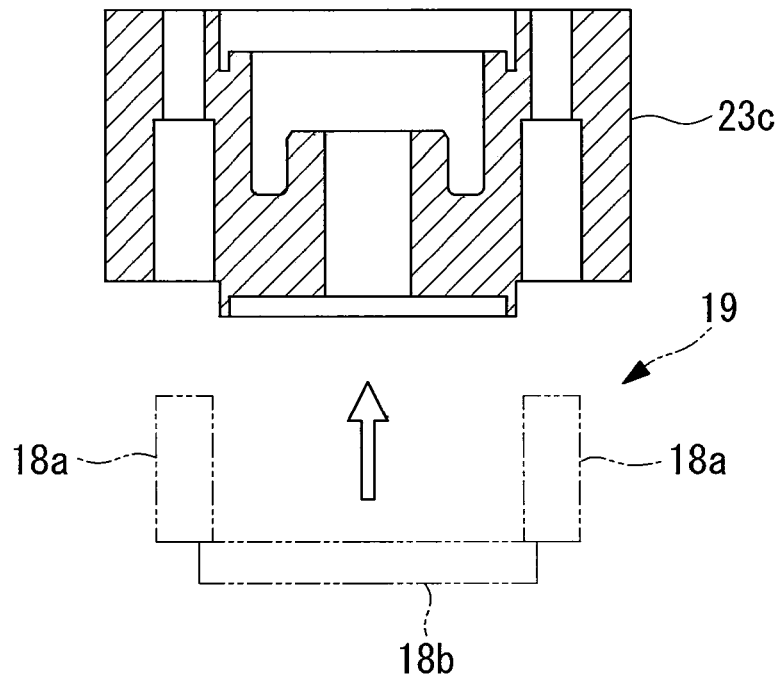
FIG. 3 is a cross-sectional view that shows the cross-sectional profile (along the cross-section A-A in FIG. 4) in a diagonal direction of the base side member (component unit) of the casing member.
Figure 4:
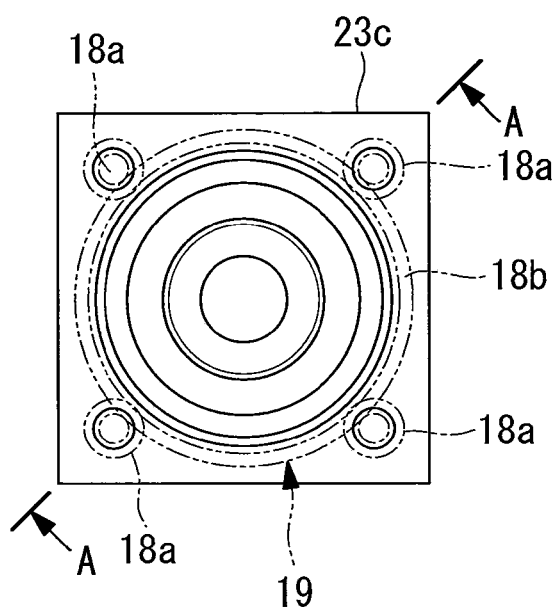
FIG. 4 is a plan view that shows the base surface when the female threading portion assembly has been fit and installed on the base side member.

The cross-sectional view in FIG. 3 shows the cross-sectional profile of an individual component, in which the female threading portion assembly body 19 has been removed, along the cross-sectional surface A-A of the base member 23c, which is a diagonal direction, shown in FIG. 4.

Preferably, the tightening of the bolts 17 is uniformly aligned by distributing the female threading portions 18, for example, at the four corners of the casing member 23, which has, for example, a rectangular cross-section, by using the female threading portion assembly 19 that is provided with female threading portions 18 disposed at an equal pitch in the peripheral direction. As a result, by carrying out the tightening of the bolts 17 uniformly, a substantially uniform compressing force acts from the linking member 18b over the entire mating surface, not just in the area of the location at which the bolts 17 are threaded into the female threading portion 18. That is, the tightening force due to the bolts 17 acts on the mating surfaces via the ring-shaped linking member 18b, and thus, even if there is a small difference in fastening force among the four bolts 17, it is possible to obtain a uniform compressing force.

Therefore, during the tightening operation while being assembled, the tightening torque control of each of the bolts 17 is facilitated, and the female threading portion assembly 19 does not rotate accompanying the tightening of the bolts 17 when accommodated and arranged at a predetermined position on the casing member 23 side. That is, the female threading portion assembly 19 having a structure in which the four female threading portions 18 are integrated also functions to prevent rotation when the bolts 17 are fastened. Thus, this facilitates the fastening operation for the bolts 17 as well. In other words, when one of the bolts 17 is tightened, the other bolts 17 do not need to be restrained by a tool because they do not rotate along with the tightening of the other bolts 17, and the operability during assembly is significantly increased.

In the case of the fluid apparatus unit 1 having the structure described above, because contamination can easily adhere to the periphery of the O-ring when a fluid such as a chemical fluid that, in particular, includes slurries, is handled, the structure does not use O-rings on the mating surfaces between components. Thus, if there is no female threading portion assembly 19 that is provided with a linking member 18b, in order to ensure the desired sealing performance, the tightening torque of the bolts 17 that have been arranged and distributed requires strict control. Therefore, carrying out uniform fastening entails increasing the number of production steps.

However, the linking ring 18b can uniformly compress the entire periphery of the seal surface even if the female threading portion assembly 19 cannot strictly adjust the respective tightening forces of each of the bolts 17. Therefore, because the tightening torque control of the bolts 17 and the adjusting of the force that attaches the casing member 23 to the base member 10 are facilitated, plural seal portions can be evenly tightened to obtain advantageous sealing characteristics.

Originally, a simple structure may be used for such a partitioned bolt structure in which one feedthrough bolt 50, shown in FIG. 14, is used and the air pressure operating valve 20B is attached to the base member 10. However, because the actuator of the air pressure operating valve 20B is an air-pressure-type on-off valve, there are many sealed portions when the air pressure operating valve 20B is viewed as a unit, and therefore, when all of the sealed portions are assembled by using one feedthrough bolt 50, this causes both the assembly process and the inspection process to become complicated, which is not preferable.

That is, as shown for example, in FIG. 2, in addition to the O-ring seal portion 60 that ensures the air pressure operation, the air pressure operating valve 20B is also formed by the seal portion 63, which ensures the seal for a fluid that flows through the inside of the air pressure operating valve 20B, and a seal portion 64, which ensures the seal when the valve is opened and closed. The sealing function of these seals is located in the base member 10, and thus, the inspection thereof is very difficult and entails a complicated process. In addition, the entire apparatus must be disassembled in order to respond to any leakage that may occur, and the assembly process becomes complicated, which is not preferable. The reference numeral 61 in the figure is a Y-shaped packing for causing the vertical movement of a piston.

In the fluid apparatus unit 1 described above, in order to integrate plural fluid apparatuses, the plural fluid apparatuses, which have plural sealed parts, are arranged on the base member 10 to form a unit, similar to the air pressure operating valve 20B. Therefore, in a completed product, following the completion of the integration of the fluid apparatuses, there are many sealed portions whose sealing performance must be confirmed, and the leakage testing operation for each of the seal portions becomes an extremely complicated process.

In the case that there should unfortunately be a leakage, not only must the entire apparatus be completely disassembled and then reassembled, but also specifying the locations of leaks is extremely difficult. Therefore, both the ameliorating of the risks of reassembly and the simplification of testing during the assembly process are similarly required.

Thus, the air pressure operating valve 20B can be controlled as a unit by using the partitioned bolt structure with the nut portions 18a and the bolts 17 without being assembled by using the feedthrough bolt 17 shown in FIG. 14. That is, by using the nut portions 18a and the bolts 17, it is possible to create a manufacturing process in which the air pressure operating valve 20B is treated as a unit, and furthermore, the air pressure operating valve 20B can be arranged on the base member 10 after confirming the respective sealing properties as a unit.

Finally, the air pressure operating valve 20B is arranged on the first installation surface 11A of the base member 10, and a bolt 17 is inserted from the bottom of the base and threaded into the nut portion 18a. Thereby, the integrated circuit of the fluid apparatus can be completed. During the seal inspection of the fluid apparatus unit 1, only the fitted portions of the ring-shaped convex portion 22 and the ring-shaped concave portion 15, which is the seal portion of the base member 10, need to be inspected. Therefore, inspection in the unit assembly line is simplified, and the identification of the cause of a leak during a leakage inspection simplified.

When considering the fluid apparatus unit 1 described above in terms of delivery, for a fluid apparatus such as the air pressure operating valve 20B, if similar components having, for example, differing specifications and functions and the like are manufactured and stored in suitable amounts, after suitably selected items are incorporated into the base 10 in accordance with the requests of the customer, the product can be shipped after performing leakage inspection only on the fitting portion between the ring-shaped convex portion 22 and the ring-shaped concave portion 15.

The various similar components for the fluid apparatus described above include, for example, those in which the on-off mode, such as normally open and normally closed, differs and those in which the presence or absence of a flow rate adjusting function differs. These components are not limited to the illustrated apparatus components, but include those in which, as a single fluid apparatus, plural sealed portions are present.

As described above, according to the fluid apparatus unit structure of the present invention, the fastening force (compressive force) between the base member 10 and the casing member 23, which is obtained by fastening each of the bolts (fastening members) 17, acts substantially uniformly over the entire periphery of the seal surface via the linking member 18b of the female threading portion assembly 19. Thus, advantageous sealing performance, in which the inter-surface sealing properties between the members 10 and 23 are maintained substantially uniformly over the entire periphery, can be easily obtained by a comparatively simple operation.

By using the female threading portion assembly 19 of the present invention, when performing an operation in which different bolts 17 are threaded and tightened from both sides of the nut portion 18*a*, because the female threading portion assembly 19 does not rotate along with the bolts 17, the effect is also obtained that the fastening operation of the bolts 17 is simplified.

In the embodiment explained above, a base member 10 was provided with four installation surfaces 11. However, the number and disposition and the like of the installation surfaces 11 are not in particular limited thereby, and these can be suitably modified depending on the number of the fluid apparatuses to be formed into a unit.

If a partitioned bolt structure, which uses the female threading portion assembly 19 in the linking structure between the installation surfaces 11 and the fluid apparatuses, is utilized, by storing similar components for the fluid apparatuses, the same base member 10 may be used, and installation of various combinations of fluid apparatus components also becomes possible.

By storing the fluid apparatuses, a quick delivery response becomes possible in comparison to the case in which the entire assembly is started from scratch.

In the embodiment described above, a structure was used in which the female threading portion assembly 19 is fitted and tightened on a base side member 23*c*, which is a partitioned member on the base side. However, a structure in which the female threading portion assembly 19 is fitted and installed in the base member 10 can obtain the same operational effects.

The present invention is not limited to the embodiments that have been described above, and suitable modifications are possible within a range that does not escape from the spirit of the present invention.

Reference Signs List

1 fluid apparatus unit
10 base member
11 installation surface
11A first installation surface
11B second installation surface
11C third installation surface
11D fourth installation surface
12, 12A, 12B slanted flow path
18*a* nut portion
18*b* linking member
19 female threading portion assembly
20A, 20B, 20C air pressure control valve
23 casing member
23*c* base side member (base side partitioned member)
30 pressure sensor
40 check valve

The invention claimed is:

1. A fluid apparatus unit structure in which plural fluid apparatus components are connected via flow paths that are to be sealed and each of whose cross-sectional profiles is circular, the components being collected together and integrated onto a base member,
wherein a casing member for the fluid apparatus components is partitioned into plural members in a base member mating direction, a female threading portion assembly in which plural female threading portions that are arranged at an even pitch in a peripheral direction and that have upper side openings and lower side openings and that communicate in the mating direction are integrated by a ring-shaped linking member, is installed between the base member and base side partitioned members of a casing member at a position in close contact with the base member, and with a base side member interposed therebetween, different linking members are threaded and tightened from both a casing member side and a base member side of the female threading portion while a uniform compressing force from the linking members acts over an entire sealing surface with respect to the base side member by a ring-shaped sealing portion formed on the base member, the ring-shaped sealing portion having at least one of a concave portion and a convex portion.

* * * * *